US009926668B2

(12) United States Patent
Axrup et al.

(10) Patent No.: US 9,926,668 B2
(45) Date of Patent: Mar. 27, 2018

(54) SUBSTANTIALLY DRY COMPOSITE COMPRISING A NANOFIBRILLATED POLYSACCHARIDE

(71) Applicant: Stora Enso Oyj, Helsinki (FI)

(72) Inventors: Lars Axrup, Hammaro (SE); Heidi Saxell, Vantaa (FI); Veikko Jokela, Rauha (FI); Henri Kastinen, Helsinki (FI); Anna Kauppi, Helsinki (FI); Kaj Backfolk, Lappeenranta (FI); Nina Ruohoniemi, Helsinki (FI); Risto Laitinen, Helsinki (FI); Isto Heiskanen, Imatra (FI); Teija Laukala, Lappeenranta (FI)

(73) Assignee: Stora Enso OYJ, Helsinki (FI)

(*) Notice: Subject to any disclaimer, the term of this patent is extended or adjusted under 35 U.S.C. 154(b) by 0 days.

(21) Appl. No.: 15/389,482

(22) Filed: Dec. 23, 2016

(65) Prior Publication Data

US 2017/0107669 A1  Apr. 20, 2017

Related U.S. Application Data

(62) Division of application No. 14/441,268, filed as application No. PCT/IB2013/059945 on Nov. 6, 2013, now Pat. No. 9,562,328.

(30) Foreign Application Priority Data

Nov. 9, 2012 (SE) ...................... 1251281

(51) Int. Cl.
D21H 11/18 (2006.01)
D21H 17/67 (2006.01)
C08B 15/02 (2006.01)
D21H 17/64 (2006.01)
C08K 3/26 (2006.01)
D21H 17/24 (2006.01)

(52) U.S. Cl.
CPC ........... *D21H 17/675* (2013.01); *C08B 15/02* (2013.01); *C08K 3/26* (2013.01); *D21H 11/18* (2013.01); *D21H 17/24* (2013.01); *D21H 17/64* (2013.01); *D21H 17/67* (2013.01); *C08K 2003/265* (2013.01); *C08L 2205/16* (2013.01)

(58) Field of Classification Search
None
See application file for complete search history.

(56) References Cited

U.S. PATENT DOCUMENTS

| 4,481,076 A | 11/1984 | Herrick |
| 5,731,080 A | 3/1998 | Cousin et al. |
| 6,153,413 A | 11/2000 | Watanabe et al. |
| 6,871,744 B2 | 3/2005 | Miller et al. |
| 2009/0022912 A1 | 1/2009 | Kaessberger et al. |
| 2010/0279019 A1 | 11/2010 | Beck et al. |
| 2011/0000633 A1 | 1/2011 | Kukkamaki et al. |

FOREIGN PATENT DOCUMENTS

| CA | 449964 | 7/1948 |
| CA | 1208631 | 7/1986 |
| EP | 0846703 | 6/1998 |
| EP | 2287398 | 2/2011 |
| JP | 2006064308 | 3/2006 |
| WO | 2006019808 A1 | 2/2006 |
| WO | 2009021687 | 2/2009 |
| WO | 2009074491 | 6/2009 |
| WO | 2009103854 | 8/2009 |
| WO | 2010112519 A1 | 10/2010 |
| WO | 2010131016 A2 | 11/2010 |
| WO | 2011004300 | 1/2011 |
| WO | 2011042607 A1 | 4/2011 |
| WO | 2011110744 | 9/2011 |
| WO | 2011139749 | 11/2011 |
| WO | 2011141876 | 11/2011 |

OTHER PUBLICATIONS

International Search Report for PCT/IB2013/059945, dated Feb. 13, 2014.
Written Opinion of the International Searching Authority for PCT/IB2013/059945, dated Feb. 13, 2014.
European Search Report and Written Opinion for PCT/IB2013/059945, dated May 3, 2016.
Chinese Patent Office, First Office Action for corresponding Chinese Patent Application No. 201380070009.3, dated Feb. 3, 2016.
Chinese Patent Office, Second Office Action for corresponding Chinese Patent Application No. 201380070009.3, dated Aug. 2, 2016.
Zhang, Lina, "Environmentally Friendly Materials Based on Biomass", Jun. 1, 2011, p. 103, Chemical Industry Press.

(Continued)

*Primary Examiner* — Mark Halpern
(74) *Attorney, Agent, or Firm* — Greer, Burns & Crain, Ltd.

(57) ABSTRACT

A substantially dry composite material comprising a nanofibrillated polysaccharide and two or more additives, wherein the composite nanofibrillated polysaccharide is a microfibrillated cellulose and wherein the additives are lime milk and carbon dioxide, wherein the additives are allowed to react with each other and forming a precipitated calcium carbonate on the nanofibrillated polysaccharide, thereby forming a composite product comprising precipitated calcium carbonate and nanofibrillated polysaccharide.

18 Claims, 6 Drawing Sheets

(56) References Cited

OTHER PUBLICATIONS

Fernandes Diniz, J.M.B., Gil, M.H., and Castro J.A.A.M., "Hornification—Its Origin and Interpretation in Wood Pulps," Wood Science Technology, vol. 37 (2004), pp. 489-494.
Miskiel, F J et al., "Use of High Amylose Corn Starch to Improve the Increase in Paper Strength Attained by Addition of Microfibrillated Cellulose," Research Disclosure, Dec. 1, 1999, 42806, Mason Publications, Hampshire, GB, ISSN 0374-4353, XP007125106.

SUBSTANTIALLY DRY COMPOSITE COMPRISING A NANOFIBRILLATED POLYSACCHARIDE

STATEMENT OF CORRESPONDING APPLICATIONS

This application is a divisional application of and claims priority to U.S. patent application Ser. No. 14/441,268 filed on May 7, 2015, which is a National Stage entry of PCT/IB2013/059945, which claims priority to and the benefit of Swedish Patent Application Number 1251281-0, the entire contents of which are incorporated herein by reference.

TECHNICAL FIELD

The present document relates to a method for producing a composite comprising nanofibrillated polysaccharide (NFP), such that it is easily re-dispersible. The present document further relates to a method for drying such a composite. More particularly, the present disclosure relates to a method for producing and drying a composite comprising microfibrillated cellulose and precipitated calcium carbonate and a substantially dry composite material obtained through the method and uses thereof.

BACKGROUND

Nanofibrillated polysaccharides, such as microfibrillated cellulose (MFC) has many end uses, such as in food, cosmetics, paints, plastics, paper, paperboard, medical products and composites, in which it would be good to be able to dosage microfibrillated cellulose in a dry form so that the original properties of wet micro fibrillated cellulose would be retained. Microfibrillated cellulose used in composites, is typically added in a dry form.

A dispersion of microfibrillated cellulose in water is a gel having pseudoplastic or thixotropic viscosity properties because fibrils are very well dispersed in the matrix (water). On drying, however, the properties of micro fibrillated cellulose are severely changed. It's dispersibility, hydration and viscosity properties may be lost or substantially reduced, depending on the severity of drying. Typically after drying, micro- and nano fibrils are bound together and much less amounts of small scale micro- or nano fibrils can be found via e.g. optical microscope.

When microfibrillated cellulose is dried it would be beneficial that not too much fibril/fibril bonds are formed, so that micro fibrils are free from each other or at least easily liberated when dispersed in a solvent or matrix. At the moment, this can be done by freeze drying or by using solvent exchange type of drying technologies. Also one possibility is to add chemicals such that fibril/fibril contacts are essentially reduced during drying.

When microfibrillated cellulose is used in composites one should ensure that micro fibrils are clearly separated from each other and that micro fibrils are very well dispersed in the matrix.

Conventional drying techniques for drying MFC are currently freeze drying which provides the best quality MFC. However, both the operating and investment costs are high and the process can be difficult to scale up to industrial processing. Spray drying, which on the other hand, can rather easily be scaled up, has high operation costs and feature in which hornification of fibrils is prone to occur. Typical chemicals used to prevent hornification of cellulose or fibrillated cellulose or cellulose fibrils has been, surface active agents or surface active polymers, carbohydrates and more specifically low molecular weight carbohydrates, starch, CMC and similar derivatives thereof. Processes utilizing chemicals can be up-scaled. However, the costs related to these chemicals can be high, and many of the chemicals are disadvantageous or even harmful in different applications.

The term "hornification" may refer to the stiffening of the polymer structure that occurs in lignocellulosic materials when they are dried or otherwise dewatered. Because of structural changes in the wood pulp fibers upon drying the internal fiber shrinks. Often the fibers needs to be rewetted, or re-suspended in water for practical use and due to these structural changes the original properties, i.e. being in a gel form having pseudoplastic or thixotropic viscosity, is not fully regained. The effect of hornification may be identified in those physical paper or wood pulp properties that are related to hydration or swelling, such as burst or tensile properties. (Hornification—its origin and interpretation in wood pulps, J. M. B. Fernandes Diniz, M. H. Gil, J. A. A. M. Castro, Wood Sci Technol 37 (2004) 489-494).

Further to this nanofibrillated polysaccharides such as MFC often form the basis of, or a part of composites suitable for applications such as plies for paper or paperboards, for use in rheology applications, in paints, foods, pharmaceuticals etc. These composites are often formed by adding a filler, such as precipitated calcium carbonate to the MFC, thus forming a PCC/MFC composite material. The calcium carbonate, or filler material, may be added in a conventional process, such as disclosed in EP2287398 or in a so called in-line process which is disclosed in for instance WO2001/110744. The formation of PCC on fibers may be achieved today in processes where lime milk is mixed in the presence of natural fibers, or dissolved cellulose, cellulose whiskers or fibrils or fibrillated aggregates, or synthetic polymer fibers and carbon dioxide. The precipitation of calcium carbonate then may occur on fibers or into fiber lumen, dissolving pulp, cellulose whiskers or synthetic polymer fibers or mixtures thereof.

Currently, PCC or even nanoPCC can be used with various technologies. The nanoPCC may be provided through methods such as those disclosed in US2009/0022912. It is also known that additives such as PVOH and PAA can be used to control crystal growth and nucleation during the precipitation of calcium carbonate. Such methods are shown in for instance WO 2009/074491 A1.

The problem with the commercially available in-line method is that it is limited to the so called wet end of a paper machine and therefore to very dilute pulp conditions. Typically, pulp composition is preferably below 1.0 wt % or more preferably below 0.5 wt %.

Another disadvantage with the present techniques is that it generates very large particle sizes of the PCC on the fibers and obviously a large fraction is formed in the liquid phase. The formation of large particles is in some cases not preferred since it further affects e.g. optical properties or wettability.

There is therefore a need for an improved process producing composites comprising nanofibrillated polysaccharide and subsequently drying these composites, which is simpler to carry out while yielding a dry or semi-dry MFC composite material, without loss of important re-dispersibility properties, since, if strong hornification or agglomeration occurs during drying the beneficial properties of cellulosic fibrils or fibrillated aggregates are not obtained. It is thus preferable that the dried composite maintains its characteristics when dispersed in other solvents or e.g. polymeric matrices.

SUMMARY

It is an object of the present disclosure, to provide an improved method of producing a composite comprising nanofibrillated polysaccharide which subsequently can be dried, while not deteriorating the re-dispersibility properties of the composite. It is further an object of the present disclosure to provide for a composite having PCC particles or even nanoPCC particles coated on the fibers of the nanofibrillated polysaccharide.

The object is wholly or partially achieved by a method according to the appended independent claims. Embodiments are set forth in the appended dependent claims, and in the following description and drawings.

According to a first aspect, there is provided a method for the production of a composite material comprising any one of a microfibrillated cellulose and a nanofibrillated cellulose, the method comprising the following steps, (i) providing a liquid suspension of the microfibrillated or nanofibrillated cellulose; wherein the solids content of the microfibrillated or nanofibrillated cellulose is over 2%, (ii) bringing said liquid suspension in contact with at least one additive, wherein the at least one additive is calcium carbonate or a precursor thereof, thereby forming a composite material suspension, wherein the composite comprises the microfibrillated or nanofibrillated cellulose and the calcium carbonate or the precursor thereof, and wherein said calcium carbonate is formed or precipitated onto fibers or fibrils of the microfibrillated or nanofibrillated cellulose; and (iii) increasing the solid contents of said composite material suspension, thereby forming a high solid contents composite material suspension; (iv) drying said high solid contents composite material suspension, through a simultaneous heating and mixing operation, whereby a substantially dry composite product is formed.

The nano-och microfibrillated cellulose may be obtained through conventional methos such as acid hydrolysis of cellulosic materials, e.g. disclosed in WO 2009021687 A1, or MFC suspension produced by enzymatic hydrolysis of Kraft pulp cellulose, e.g. disclosed in WO2011004300 A1, acid hydrolysis followed by high pressure homogenization, e.g. disclosed in US20100279019, or by any other means known to the skilled person. The nanofibrils can thus be liberated from untreated or pre-treated fibers by using mechanical forces such as refiners or grinders. The concentration of MFC in such suspensions is usually about 1-6% and the remaining part is water. It is also possible to use ionic liquids to create nanocellulose or microfibrillated cellulose.

Through this method is thus possible to, in a cost and energy efficient manner, achieve a substantially dry composite material, comprising MFC, wherein the problems associated with hornification have been greatly reduced or completely abolished.

By substantially dry composite material is meant that the composite may contain some water, and be semi-dry, i.e. about 50-1 wt-% water or less.

The liquid suspension may contain water, and also other co-solvents, such as ethanol or isopropanol. These co-solvents may be recycled during the mixing and heating operation.

The at least first additive may be an alkaline earth carbonate or a precursor thereof and the alkaline earth carbonate may be any one of a calcium carbonate, a magnesium carbonate, a combination thereof, a precursor or a combination of precursors thereof.

This means that the composite may be formed by adding precursors of e.g. calcium carbonate such that the calcium carbonate may be formed or precipitated onto or into the fibers or fibrils of the polysaccharide. This means that the $CaCO_3$ forms a composite with the MFC.

According to one embodiment of the first aspect the solids content of the nanofibrillated polysaccharide in step (i) may preferably be higher than 0.5 wt-%, and more preferably higher than 1 wt-%, and even more preferably higher than 4 wt-%.

This method allows for the adsorption of lime milk or $CO_2$ on fibrils thus allowing carbonation orprecipitation of e.g. calcium carbonate in a suspension of nanofibrillated polysaccharide, such as MFC, where the concentration of pulp, is relativley high compared to conventional methods, where the concentration is preferably below 0.5 wt-%. It has surprisingly been found that by increasing the pulp concentrations, preferably over 2% and more preferably over 4%, a higher fraction of small nanoparticles may be formed on the cellulose fiber surface. At higher MFC concentrations, it gave very high coverage of PCC on the microfibers which usually is not obtained with the traditional techniques. Feeding ratios of precursor materials such as carbon dioxide ($CO_2$) and lime milk did not have an effect, whereas the use of certain additives had some effect on particle morphology when performing tests at higher MFC solid contents.

The said process is preferably performed as a batch or continuous process, but not excluding an in-line process. The end uses for a composite formed through this method may be in paper or other applications such as plastics, food, medicine, tooth paste, paints, etc., where a fine coating of the PCC or nanoPCC on the fibers is advantageous.

According to this embodiment, in step (ii) of bringing said liquid suspension in contact with at least one additive, thereby forming a composite material suspension, the ratio between the nanofibrillated polysaccharide and the at least one additive may be greater than 1:1, or greater than 3:1, or greater than 6:1, or greater than 9:1.

According to the first aspect the additive may provided by an in-line production method, wherein the additive or additives are provided into the liquid flow of a paper machine by feeding said additive simultaneously as said aqueous suspension of nanofibrillated cellulose, thereby forming a composite material suspension in the liquid flow of the paper machine.

It is also possible to have a parallel stream of reacted product to be fed into the surface size or to coating colors thus forming an improved end product with the said material on the surface.

According to one embodiment, when there are two or more additives, the method further may comprise a step of allowing these to react with one another.

The additives may be carbon dioxide and lime milk. The carbon dioxide an lime milk thus forms precursors of the alkaline earth carbonate calcium carbonate. It has been found that precipitation of calcium carbonate ($CaCO_3$) onto MFC works very well and it is simple and cost efficient process.

Further it has been found out that by precipitating $CaCO_3$ on the surface of micro fibrillated cellulose no or extremely little amount of free $CaCO_3$ is present in the composite, the $CaCO_3$ stay on the MFC surface even after high shear (even after refining and fluidization), which makes a big difference if ready made nanoparticles would be have been post-added to the MFC suspension. Even further precipitating CaCO₃ on the surface of coarse MFC improved fibrillation and runnability in pressure homogenization.

Thus the composite formed in the short circulation may thus be a MFC and PCC composite, where the PCC is precipitated onto the surface of the fibrils of the microfibrillated cellulose.

This process may also be both efficient and cost effective and may be performed as described in WO2011/110744 A2.

The MFC/PCC ratio may be in the range of 80/20 to 20/80, or even more preferred 50/50 ratio.

Also the dewatering, i.e. increase of the solids content of MFC/PCC composite may be performed more easy than for an MFC suspension alone, and the drying of MFC/PCC may be easier than for a MFC suspension alone.

Further, drying shrinkage is essentially reduced compared to pure MFC, and the MFC/PCC composite is very compatible with plastics. The rewetting of dry MFC/PCC composite may also be easy and essentially major part of the fibrils are re-dispersed in water phase. Also wet mixing of MFC/PCC composite will improve amount of re-dispersable fibrils much more than with MFC.

The addition of carbon dioxide and lime milk may be performed as described in CA449964.

According to the first aspect the solid contents of the composite material in step (iii) may be increased to >20% by weight, or more preferably to >25% by weight, or even more preferably to >30% by weight.

According to one alternative step (iv) may comprise a mixing and grinding operation.

This grinding operation may be performed in a PVC mixer or by any similar method, such as a high speed mixer, where the mechanical energy is converted into heat in the suspension whereby water is caused to evaporate. Alternatively part of the energy may be used to provide for a fibrillation or to cut fibers. Since the solids content, or the dry contents of the suspension is relativley high at the onset of mixing the shear forces, and friction evolved in the suspension becomes greater thus resulting in an increased temperature. At a solids content of >10 wt-% the MFC-PCC composite suspension is viscous, thus causing greater friction.

According to one alternative solution step (iv) may comprise any one of a centrifugal force operation, mechanical pressing operation and dewatering operation. The dewatering operation may comprise an electro-osmosis operation. The mechanical pressing operation may comprise any one of a wet pressing operation or a screw pressing operation.

The step of increasing the solids content, or dewatering of the MCC/PCC composite may also be performed with a paper machine (head box, dewatering on wire, press section and drying section).

According to one alternative the temperature, at/in step (iv), of the composite material is in the range of 75-99° C., preferably about 85° C.

The temperature is thus kept relativley low, which is advantageous not only in that less energy is consumed, but also in that the effect on hornification of the micro fibrils may be reduced, as hornification is prone to occur at a higher temperature. This increase in temperature is created through the mechanical energy provided to the suspension by the mixing operation. The temperature increase could also, alternatively be achieved trough actively heating the suspension, depending on the desired properties of the dry product.

The composite material at step (iv) may be heated from about room temperature to the range of 75-99° C.

According to one alternative step (iv) may be performed under vacuum.

By introducing a vacuum, or performing the drying step under vacuum it is further possible to reduce both the energy needed and the drying temperature, which may lead to a further reduction in the hornification of the micro fibrils. If vacuum is introduced the heat developed trough the mechanical energy provided to the suspension may be lower than under normal pressure.

According to one alternative of the first aspect there may further be provided a drying additive in step (iv).

By introducing a drying additive the drying process may be event further improved. Such additives are disclosed in CA1208631. The drying additive may also be a solvent.

According to a second aspect there is provided a substantially dry composite material comprising a nanofibrillated polysaccharide and at least one additive, obtainable by the method according to the first aspect.

By "substantially dry composite material comprising NFP" is meant that the water content in the composite product is reduced to a level where the product may be in a powder form or even a gel form, but still being suitable for re-dispersion, in a solvent such as water or into a water or gel phase. The product may also be in a semi-dry state having a water content of about 10-15 wt-%

As such the solids content of the product may be in the range of 50-99 wt-%. In a preferred embodiment the solids content is in the range of 75-90 wt-%.

The dry composite product obtained through the method described above may have very good and well separated straight individual micro fibrils when re-dispersed, i.e. the hornification problems normally associated with drying of MCF-PCC has been greatly reduced. The applicability of this dried composite product may therefore be greatly increased for applications such as composites, food and pharmaceutical uses.

According to the second aspect the nanofibrillated polysaccharide may be a microfibrillated cellulose.

According to the second aspect the additives may be lime milk and carbon dioxide, forming a precipitated calcium carbonate on the nanofibrillated polysaccharide, thereby forming a composite product comprising precipitated calcium carbonate and nanofibrillated polysaccharide.

According to a third aspect there is provided the use of the composite material according to the second aspect, for the production of sheet like paper materials. Such sheet like paper materials may include substrate for copy machines (copy paper), printing (printing paper), packaging (packaging paper), cellulose films, and substrate for printed electronics.

According to a fourth aspect there is provide the use of the composite material according to the second aspect, for mixing with plastics materials.

According to a fifth aspect there is provided the use of the composite material according to the second aspect, for further pressing and forming of a composite product.

BRIEF DESCRIPTION OF THE DRAWINGS

Embodiments of the present solution will now be described, by way of example, with reference to the accompanying schematic drawings.

DESCRIPTION OF EMBODIMENTS

Definition of Nanofibrillated Polysaccharide

Figure 1:
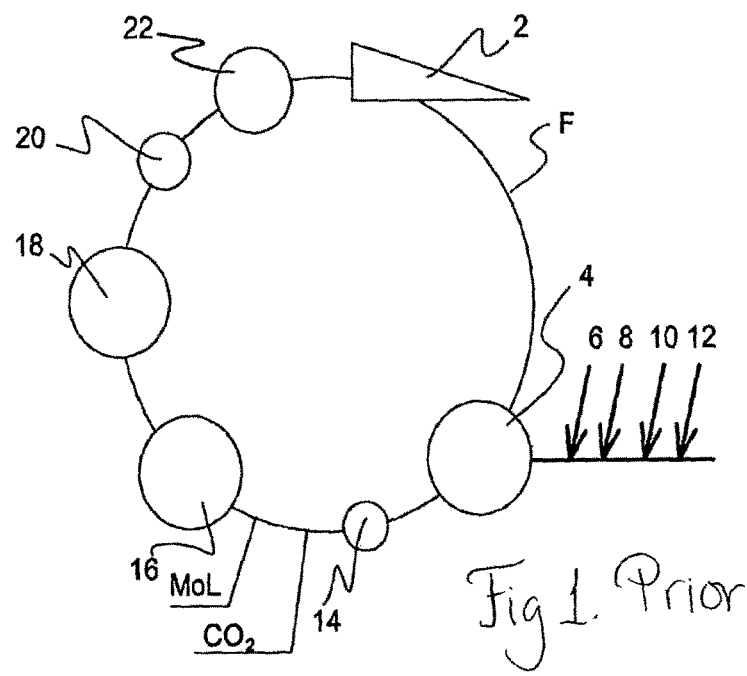
FIG. 1 shows schematically a short circulation arrangement according to prior art.

This definition includes bacterial cellulose or nanocellulose spun with either traditional spinning techniques or with electrostatic spinning. In these cases, the material is preferably a polysaccharide but not limited to solely a polysaccharide. A polysaccharide can be e.g. starch, protein, cellulose derivatives, etc.

Also microfibrillated cellulose as defined more in detail below is included in this definition.

Definition of Microfibrillated Cellulose

The microfibrillated cellulose (MFC) is also known as nanocellulose. It is a material typically made from wood cellulose fibers, both from hardwood or softwood fibers. It can also be made from microbial sources, agricultural fibers such as wheat straw pulp, bamboo or other non-wood fiber sources. In microfibrillated cellulose the individual microfibrils have been partly or totally detached from each other. A microfibrillated cellulose fibril is normally very thin (~20 nm) and the length is often between 100 nm to 10 µm. However, the microfibrils may also be longer, for example between 10-200 µm, but lengths even 2000 µm can be found due to wide length distribution. Fibers that has been fibrillated and which have microfibrils on the surface and microfibrils that are separated and located in a water phase of a slurry are included in the definition MFC.

Furthermore, cellulose whiskers, microcrystalline cellulose (MCC), nanocrystalline cellulose (NCC) or regenerated cellulose fibers and particles are also included in the definition MFC.

The fibrils may also be polymer coated fibrils, i.e. a modified fibril either chemically or physically.

Definition of Precipitated Calcium Carbonate (PCC)

Almost all PCC is made by direct carbonation of hydrated lime, known as the milk of lime process. Lime (CaO) and carbon dioxide, which can be captured and reused is formed in this process. The lime is slaked with water to form $Ca(OH)_2$ and in order to form the precipitated calcium carbonate (insoluble in water) the slaked lime is combined with the (captured) carbon dioxide. The PCC may then be used in paper industry as a filler or pigmentation agent or coating agent. It can also be used as filler in plastics or as additive in home care products, tooth pastes, food, pharmaceuticals, paints, inks etc.

In the definition of PCC, other divalent metal ions can be used instead of Calcium ion when forming the crystals. One example is the use of $Mg(OH)2$ and carbon dioxide which forms the Magnesium carbonate.

Below is a definition and description of the term "in-line process" and different possible ways to operate such a process. However the present invention is not to be limited to this process only, but may be performed in a batch or continuous operation also. The below description is thus included in the present document in order to clarify and exemplify one way of achieving the composite material. Other embodiments, such a conventional off-line operations etc. are also described in the below.

Definition of in-line Precipitated Calcium Carbonate Process

By "in-line production" is meant that the precipitated calcium carbonate (PCC) is produced directly into the flow of the paper making stock, i.e. the captured carbon dioxide is combined with slaked lime milk inline, instead of being produced separately from the paper making process. Separate production of PCC further requires the use of retention materials to have the PCC fastened, adhered or adsorbed to the fibers. An in-line PCC process is generally recognized as providing a clean paper machine system, and there is a reduced need of other retention chemicals. An in-line PCC process is for instance disclosed in WO2011/110744.

In the in-line production the PCC is formed, not in the aqueous phase but directly onto the fibrils of for instance microfibrillated cellulose. This means that the PCC may be very tightly bound to the microfibrillated cellulose and thus forming a PCC/MFC-composite material, instead of the PCC merely being admixed into the MFC suspension or slurry.

FIG. 1 shows a prior art method for inline production of precipitated calcium carbonate, as disclosed in US2011/0000633 and a schematic process arrangement for a paper making machine 2. The white water F, is carried to e.g. a mixing tank or filtrate tank 4, to which various fibrous components are introduced for the paper making stock preparation. From fittings at least one of virgin pulp suspension (long-fiber pulp, short-fiber pulp, mechanical pulp, chemo mechanical pulp, chemical pulp, microfiber pulp, nanofiber pulp), recycled pulp suspension (recycled pulp, reject, fiber fraction from the fiber recovery filter), synthetic fibers, additive suspension and solids-containing filtrate is carried to the mixing tank, and from there conveyed by a mixing pump 14 to a vortex cleaner 16, where heavier particles are separated. The accept of the vortex cleaning continues to a gas separation tank 18, where air and/or other gases are removed from the paper making stock. The paper making stock is then transported to a feed pump 20 of the headbox, which pumps the paper making stock to a so-called headbox screen 22, where large sized particles are separated from the paper making stock. The accept faction is carried to the paper making machine 2 through its headbox. The short circulation of fiber web machines producing less demanding end products may, however, not have a vortex cleaner, gas separation plant and/or headbox.

In the prior art process the PCC production is performed in the short circulation of the paper making machine, before the vortex cleaning plant 16. The carbon dioxide ($CO_2$) is injected on the pressure side of the vortex cleaner and the lime milk (MoL) is injected a few meters after the carbon dioxide has dissolved in the same pipe. It is however conceivable that this PCC production could take place closer to the headbox, or that the distance between the injectors is very small, virtually injecting carbon dioxide and lime milk at the same location in the short circulation. This depends on the requirements of the end product and the design of the paper making machine.

According one alternative an inline production method may be provided where additives, such as carbon dioxide, milk lime etc., are fed into the short circulation of the paper making machine, i.e. into the fibrous web or paper making stock, and where a suitable amount of a microfibrillated cellulose, MFC, is provided substantially simultaneously as these additives are being fed into the short circulation.

This allows for the above mentioned formation of PCC on the fibrils of the MFC.

What is meant by "substantially simultaneously" may vary as described below, however in this context it is to be understood that the MFC is provided such that the additive, such as e.g. PCC may be formed, i.e. crystallized onto or into the MFC.

Where two or more additives are fed into the short circulation these are preferably allowed to react with one another, which means that they are fed into the short circulation in a manner which allows for the additives to react, in the case of lime milk and carbon dioxide, such that precipitated calcium carbonate is formed onto or into the MFC.

According to one embodiment, an in-line PCC process is combined with the dosage of MFC into the in-line PCC process. This provides for a completely new way of providing PCC to for instance a fibrous web in a paper making process.

Figure 2:
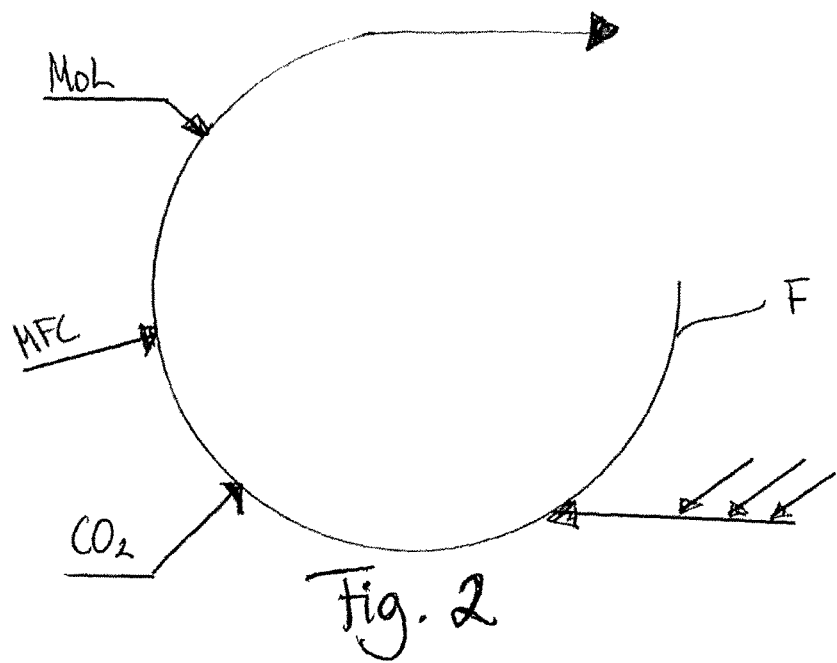
FIG. 2 shows schematically a short circulation arrangement according to one embodiment of the invention.

In one embodiment, as shown in FIG. 2 lime milk, carbon dioxide and MFC are injected separately into the short circulation and fibrous web of the paper making machine.

Figure 3:
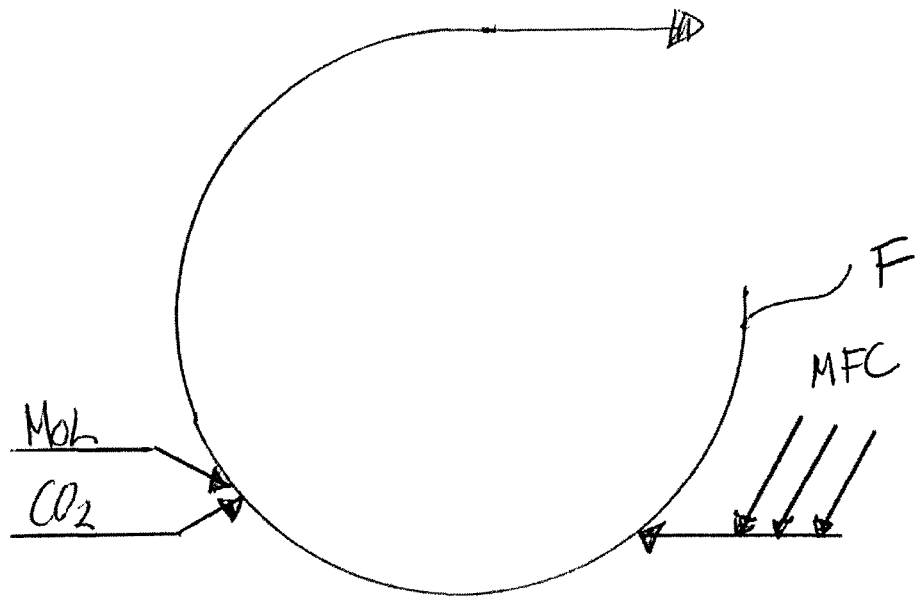
FIGS. 3a-b show schematically a short circulation arrangement according to one alternative embodiment of the invention.
Figure 3:
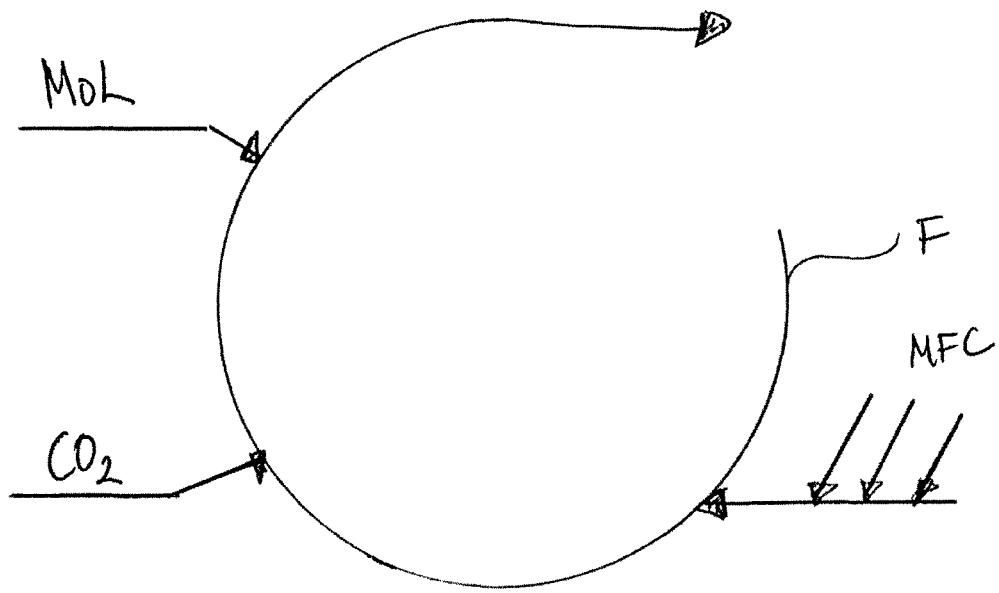

In an alternative embodiment, as shown in FIGS. 3a and 3b the MFC is provided e.g. in the preparation of the paper making stock, and thus is present in the paper making stock and the carbon dioxide and lime milk are injected separately (FIG. 3a) or simultaneously (FIG. 3b) into the short circulation.

Figure 4:
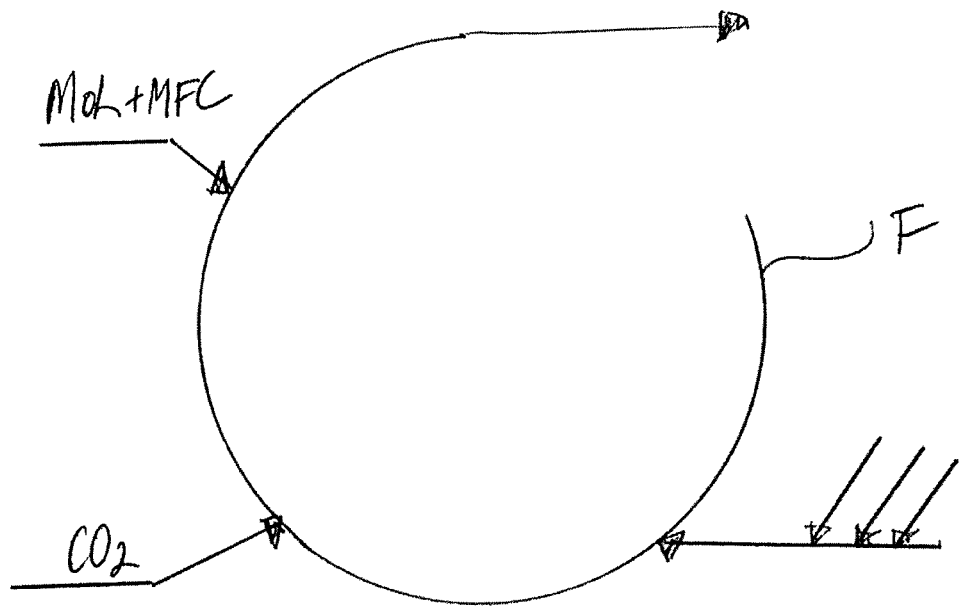
FIG. 4 shows schematically a short circulation arrangement according to yet an alternative embodiment of the invention.

In yet an alternative embodiment, as shown in FIG. 4 the lime milk and the MFC are mixed before the injection into the short circulation and the carbon dioxide is injected separately from this mixture.

Figure 5:
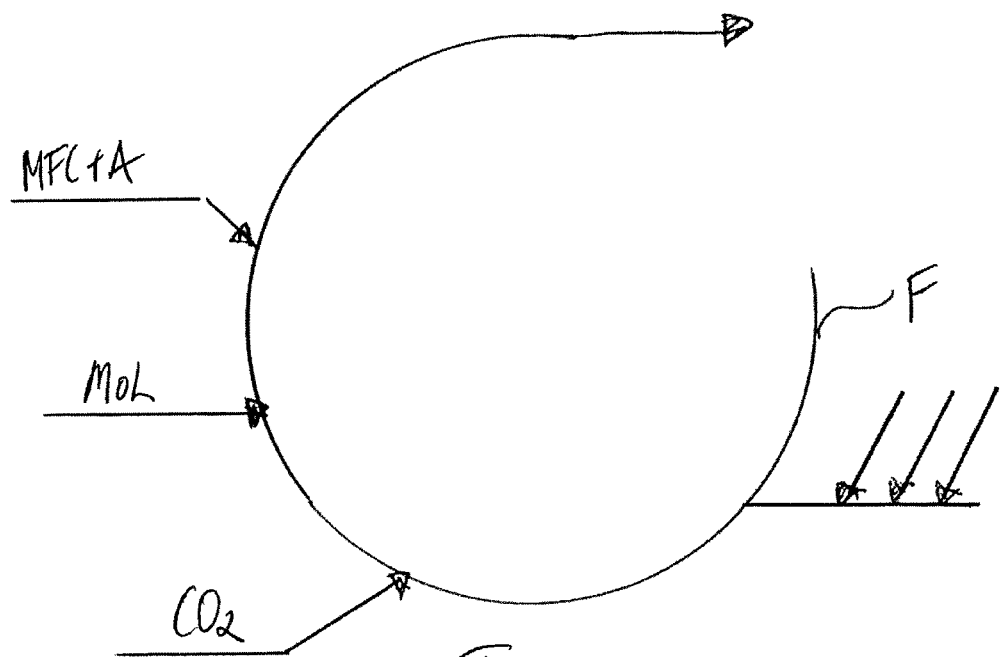
FIG. 5 shows schematically a short circulation arrangement according to yet another alternative embodiment of the invention

In yet another alternative embodiment the, as shown in FIG. 5, the MFC is mixed with other additives and this mixture is injected separately from the lime milk and carbon dioxide.

In all of the above described embodiments it is to be understood that the order of injection of the additives, i.e. lime milk, carbon dioxide, MFC and possibly other additives may occur in a different order or at a different stage in the short circulation. It is conceivable that the injection occurs very close to the headbox, or that the MFC is dosage prior to the addition of the carbon dioxide or that the distances between the "injection points" is shorter or longer than described above. Thus the MFC, lime milk and carbon dioxide may be injected into the short circulation substantially at the same injection point.

The point or point where the injection takes place thus forms a "PCC reaction zone", where the PCC is formed onto and into the MFC fibers.

According to one embodiment the MFC provides for an increased fiber surface area onto which the PCC may precipitate.

By modifying and adjusting the surface energy, surface area, surface pH and surface chemistry of the MFC there is provided a completely new way of controlling how the PCC crystals are formed on the surface of the MFC. The crystals formed on the surface of the MFC particle may take on different shapes and configurations.

By combining the in-line PCC process with a dosing or introduction of MFC there is provided a new way of controlling the paper making process without, e.g. modifying the entire white water circulation.

This in-line process allows one way of forming of a composite comprising PCC and MFC, or between any an alkaline earth carbonate and nanofibrillated polysaccharide (as defined above).

The composite thus comprises the alkaline earth carbonate in the form of a precipitate, e.g. PCC, onto or into the fibrils of the nanofibrillated polysaccharide, e.g. MFC.

The alkaline earth carbonate may also precipitate and be formed on virtually any fibers and/or fibrils present in e.g. a paper making stock, even though the main aim of the present invention is that the alkaline earth carbonate is precipitated onto the fibrils of e.g. MFC.

The alkaline earth carbonate is thus according to one embodiment, as such not added to the suspension comprising the nanofibrillated polysaccharide. Instead precursors of the alkaline earth carbonate is added, such as for instance carbon dioxide and milk of lime, or carbon dioxide and magnesium hydroxide $Mg(OH)_2$.

The composite formed between the alkaline earth carbonate and the nanofibrillated polysaccharide may further contain other substances such as stabilizing chemicals such as polyphosphate-, polyacrylate-, polyacrylic-dispersants, different types of surfactants such as SDS, SDBS, CTAB, etc. The composite might also containing compounding or coupling chemicals such maleic anhydride functionaloized chemicals, acrylic co-polymers, acrylic acids, as needed when mixing with plastics. The composite might also contain other functional additives such as optical brighteners, lubricants, primers, absorbents, dyes, and charge controlling agents. The said composite might also contain other fillers or synthetic polymers providing e.g. improved barrier properties or e.g. thermoplasticity.

According to an alternative embodiment the PCC, or precipitated alkaline earth carbonate is formed in a traditional off-line method, such as a batch or continuous process, and brought into contact with the MFC anywhere in the paper making process, trough conventional methods, such as those disclosed in EP2287398, where calcium carbonate particles are introduced into a suspension comprising cellulosic or starch fibrils, where the calcium carbonate particles have a well defined size, and wherein further calcium ions (calcium oxide or calcium hydroxide) and carbon dioxide is introduced into the fibril suspension in order to induce the calcium carbonate to precipitate on the fibrils.

According to one embodiment the precipitation of the alkaline earth carbonate takes place directly onto or into the fibrils of the nanofibrillated polysaccharide, according to such an embodiment the nanofilbrillated polysaccharide is of course brought into contact with precursors of the alkaline earth carbonate, as described above, but not necessarily in an in-line process. This may also be performed in an batch or continuous operation.

In the above processes including the production and formation of a precipitated calcium carbonate onto or into the fibers of a nanofibrillated polysaccharide, such as MFC, is described.

The skilled person would, however, easily recognize that also other alkaline earth carbonates may be used to form the desired composite material. Such alkaline earth carbonates may be magnesium carbonate, or a combination of magnesium and calcium carbonate. The production processes may then, evidently, be adjusted for these types of carbonates or combinations of carbonates.

The present invention combines the production of a composite material, comprising a nanofibrillated polysaccharide, an alkaline earth carbonate precipitated onto and into the particles thereof, thus forming a hybrid material or composite, with a process and method of effectively drying the hybrid material or composite to achieve a substantially dry composite material.

According to a preferred embodiment the alkaline earth carbonate is a calcium carbonate, which is already commonly and widely used within the paper making industry, for instance as a filler for the production of paper materials, plies for boards.

The method of providing the composite material may thus be an in-line PCC process with simultaneous dosing of MFC as described in detail above, or an off-line PCC process.

According to yet an alternative the concentration of the nanofibrillated polysaccharide, when adding or contacting the alkaline earth carbonate or the precursors thereof to the suspension of the nanofibrillated polysaccharide to form the composite material, may be in the range of 0.5-4 wt-%, or in a preferred embodiment at least above 0.5 wt-%, or more preferred above 3 wt-%, or even more preferred above 4 wt-%. In this embodiment the formation of the composite is preferably made in a batch or continuous process.

Figure 10:
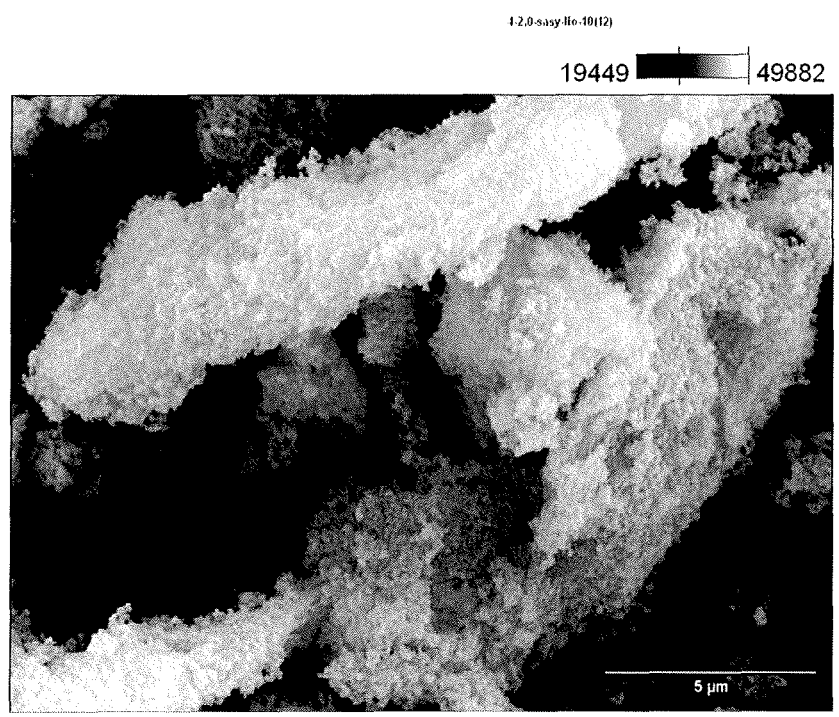
FIG. 10 is a SEM image of a microfibrillated cellulose/PCC composite

The advantage of the in-line PCC process for the provision of the composite material is that the PCC may be tightly bound to the fibrils of the nanofibrillated polysaccharide, and the composite thus formed may be even easier to process through the drying process, which is also shown in FIG. 10. It should however be understood that other alkaline earth carbonates may be used instead of and as equivalents to calcium carbonate.

The process of achieving an substantially dry composite material is described in the below.

An aqueous suspension of nanofibrillated polysaccharide is provided. The solid contents of this suspension may be in the range of 0.001 to 1 wt-%.

The nanofibrillated polysaccharide suspension is then brought into contact with at least one additive, thereby forming a composite material between the NFP, MFC or nanofibrillate cellulose, and the additive or additives.

According to one alternative, as described above, the additive may be a calcium carbonate, or any other alkaline earth carbonate, which is allowed to precipitate onto the fibrils, i.e. the additives are precursors of the alkaline earth carbonate.

The nanofibrillated polysaccharide may also, according to another embodiment, be brought into contact with two (or more) additives. These additives may be, as described for the inline-PCC process, carbon dioxide and lime milk, this forming PCC directly onto or into the NFP fibrils.

The solids content or the consistency of the resulting composite material suspension is then increased to at least 20% by weight. According to one embodiment the solids content of the suspension is raised to 30-35%.

This increase may be performed by a mechanical dewatering. According to one embodiment this dewatering is performed by centrifugation. According to another embodiment it is performed through pressing, such as wet pressing in a paper making machine. According to yet an alternative embodiment the dewatering is performed through electro-osmosis. Other alternative ways to provide for an increase in the solids content of the suspension may include, but is not limited to any one of a decanter centrifuge, wire press, belt press, extended dewatering nips, and magnetic dewatering.

The dewatering may also be performed by heating to a suitable temperature, evaporation, or adsorption e.g into felt or using radiation such as IR, NIR or microwave. When selecting the suitable manner to increase the solids content care must however be taken that the chosen method does not, in a negative way, influence the occurrence of hornification, which the skilled person would readily be able to determine.

According to the method, after the solids content has been increased the composite material suspension is dried. This drying operation is performed through a simultaneous grinding and heating of the suspension, for instance in a mixing apparatus, and thereby effecting removal of water by evaporation. Alternatively the drying operation is performed under vacuum, i.e. the suspension is treated under vacuum.

The composite can also be dried with spray drying or freeze drying or other conventional methods typically used for drying nano- and micropigments.

According to one alternative the drying is performed through a mixing or grinding-drying operation, e.g. by PVC mixer or similar method where heat and mechanical energy is introduced at the same time as water is allowed to evaporate.

According to one embodiment, at the drying operation, the temperature of the suspension is in the range of 75-99° C., preferably about 85° C. For instance the mixing apparatus may heat the dispersion from about room temperature to the range of 75-99° C.

According to one alternative embodiment the temperature of the suspension may be further increased, for instance in the mixing apparatus after the MFC suspension has been dried to a water content of at most 10 wt-%. According to this embodiment the temperature may be increased from 75-90° C. to about 95° C.

The drying may also be performed at other temperatures, which may be higher or lower than the temperatures stated above.

According to one embodiment the drying can be done in presence of different additives, such as those disclosed in CA1208631.

According to one embodiment the suspension may be cooled or kept at a constant temperature by cooling or heating the suspension. The cooling or heating may be performed by conventional means know to the skilled person.

The total drying time at the drying operation step may be in the range of 15-40 min, preferably about 30 min, thus allowing for a relativley fast drying operation which may be incorporated into a industrial process. The drying time may be dependent on the initial solids content of the suspension, the energy input, any additives and the batch size.

The drying operation may thus results in a substantially dry MFC/PCC composite material.

This composite material may be subsequently processed or used for a variety of different applications.

It may be dried and processed into sheet like materials such as substrates for different paper types, e.g. copy paper, printing paper, specialty paper and packaging paper or paperboard or formable moulds. It may also be processed into substrate for printed electronics.

According to another alternative the MFC/PCC composite material may be mixed with different types of plastics to achieve a plastics composite.

The composite may also be used in different types of foods, pharmaceuticals, toothpaste, paints etc.

The MFC/PCC composite material may also in itself be pressed and formed into different types of composite products.

One advantage of said method is that either one of the components may act as a carrier material and the other as an active chemical and hereby be incorporated into another matrix.

EXAMPLE 1

Different composite materials were formed through the below described process or method.

A pure microfibrillated cellulose was made from pretreated pulp which is then fibrillated and dispersed into a suspension using a homogenizator, having a solids content of about 1.5% by weight, which thus formed the starting concentration of the process.

The composite was then formed through an in-line process, such as described in WO 2011/110744A2, by adding suitable amounts of $CO_2$, MFC and milk of lime. In the process that carbon dioxide and milk of lime were introduced substantially simultaneously. Depending on the amounts used of carbon dioxide and microfibrillated cellulose the ratio of the PCC:MFC formed can be controlled. The temperature of the MFC suspension was about 55° C.

Figure 6:
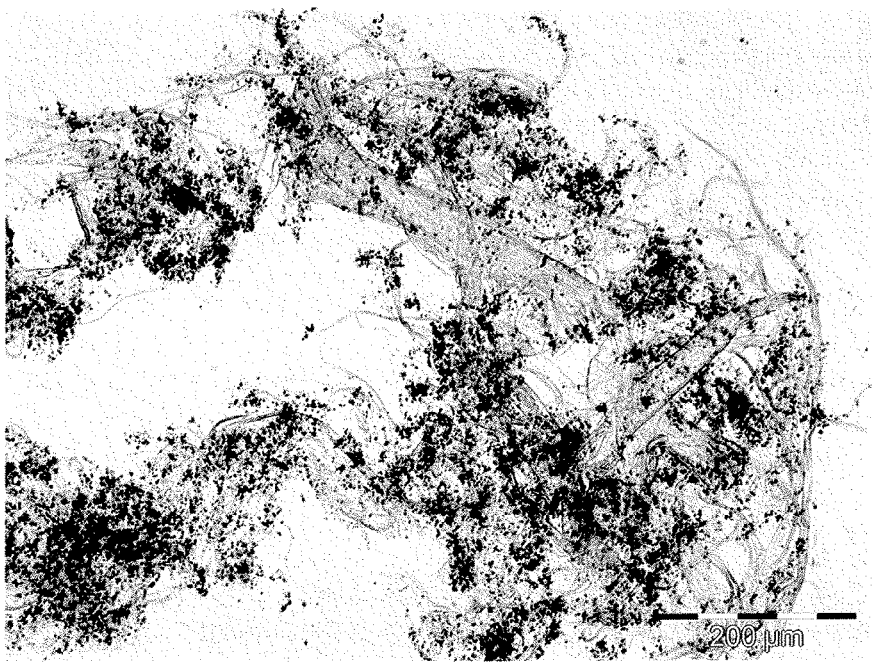
FIG. 6 is a microscope picture captured of coarse microfibrillated cellulose/PCC composite with a ratio 65:35. It shows that there was not formed any free PCC (CaCO3) in the water phase and thus the reaction preferably occurs on the fibrils. The scale of the bar is 200 um.

FIG. 6 illustrates a coarse microfibrillated cellulose/PCC composite at a 65:35 ratio. No free precipitated calcium carbonate could be seen in the water phase, which implies that substantially all calcium carbonate has been precipitated onto the surface of the MFC fibrils and fiber particles.

Figure 7:
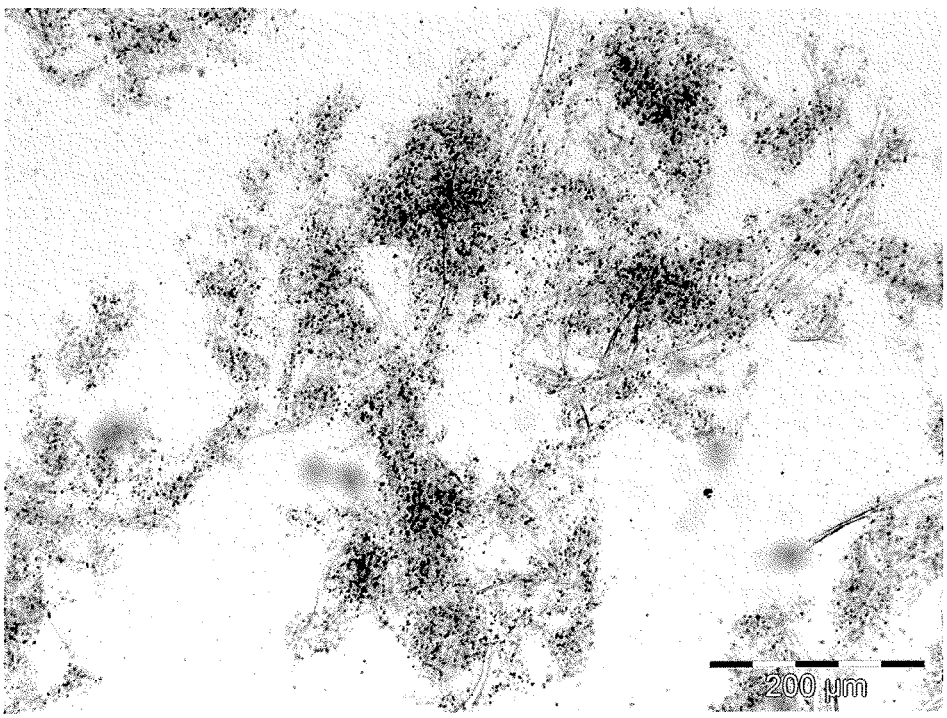
FIG. 7 is a microscope image captured of microfibrillated cellulose/PCC composite with a ratio of 65:35.

FIG. 7 illustrates a MFC/PCC composite at a 65:35 ratio after mechanical treated in a pressure homogenization at approximately 1500-2000 bars. From the picture it is clear that there is very little free precipitated $CaCO_3$ in the water phase despite the high shearing force, thus showing that the composite material is stable against shearing forces.

This implies that the calcium carbonate particles are so tightly adhered to the MFC, through the fact that precipitation occurs directly onto the fibrils of the MFC, that it they remain adhered to the MFC even after being subjected to high shear forces.

This image was taken of the sample after pressure homogenization demonstrating that there MFC/PCC forms a very strong hybrid material which is shear stable. It is thus difficult to remove the PCC from the surface although using high shear pressure.

Figure 8:
FIG. 8 is a microscope image of microfibrillated cellulose/PCC composite (ratio 75:25) after drying and subsequent re-dispersion in water without mixing or refining.

FIG. 8 illustrate a MFC/PCC composite in ratio 75:25 after drying and rewetting without wet mixing. This shows the excellent re-dispersible properties of the composite material, i.e. there is no need to use high mechanical shearing to achieve the re-dispersion. The PCC particles on the MFC fibrils keeps the fibrils separated from each other and thus prevent hornification and improves the redispersion in water after drying.

EXAMPLE 2

Figure 9:
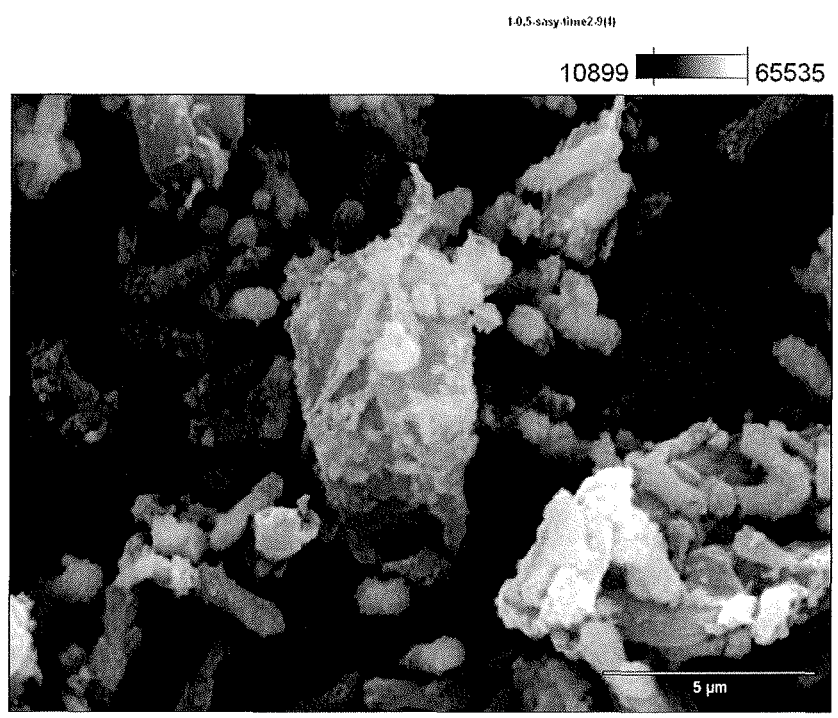
FIG. 9 is a SEM image of a microfibrillated cellulose/PCC composite.

Batch experiments were made with microfibers (Arbocel UFC 100, JRS). In FIG. 9 the result from an experiment using a suspension having a consistency of microfiber was 1 wt-%. Lime milk was then added after which $CO_2$ was fed. The reaction took place under continuous stirring at approximately 25° C. In the image the presences of large PCC particles which are particles fixed on the cellulose but also particle co-agglomerated. The picture was taken after 8 minutes reaction time.

In FIG. 10 the result of a similar batch experiment made at 4% microfiber consistency is shown.

The order of the addition of chemicals and other conditions were the same as in the experiment with 1 wt-% above. The initial pH value was about 12, whereas it dropped to around 7.5-8.5 during the progress of the reaction. The feeding of $CO_2$ was about 1.5 l/min. The reaction was usually stopped at about 10-15 min. The pictures was taken after 10 min reaction time. In this case, the fibers have been totally coated with nanoPCC particles and much less particles can be seen in the water phase.

The invention claimed is:

1. A substantially dry composite material comprising a nanofibrillated polysaccharide and two or more additives, wherein the nanofibrillated polysaccharide is a microfibrillated cellulose and wherein the two or more additives are lime milk and carbon dioxide, wherein the additives are allowed to react with each other and forming a precipitated calcium carbonate on the nanofibrillated polysaccharide, thereby forming said substantially dry composite material comprising precipitated calcium carbonate and nanofibrillated polysaccharide, said substantially dry composite material having a solids content in a range of 75-90 wt %, said substantially dry composite material being formed into a paper substrate sheet.

2. The substantially dry composite material of claim 1, wherein said substantially dry composite material comprising precipitated calcium carbonate and nanofibrillated polysaccharide is mixed with plastic materials.

3. The substantially dry composite material of claim 1, wherein the two or more additives further comprise stabilizers, surfactants, coupling chemicals, optical brighteners, lubricants, primers, absorbents, dyes, charge controlling agents, fillers, synthetic polymers, or combinations thereof.

4. The substantially dry composite material of claim 1, wherein the two or more additives further comprise polyphosphate dispersants, polyacrylate dispersants, or polyarylic dispersants.

5. The substantially dry composite material of claim 1, wherein the two or more additives further comprise SDS, SDBS, or CTAB.

6. The substantially dry composite material of claim 1, wherein the two or more additives further comprise maleic anhydride functionized chemicals, acrylic co-polymers, or acrylic acids.

7. A substantially dry composite material comprising a microfibrillated cellulose or a nanofibrillated cellulose, wherein the composite material is obtainable by the method of:
(i) providing a liquid suspension of the microfibrillated or nanofibrillated cellulose; wherein the solids content of the microfibrillated or nanofibrillated cellulose is over 2%;
(ii) bringing said liquid suspension in contact with two or more additives, wherein said additives are allowed to react with each other, wherein said additives are calcium carbonate or precursors thereof, thereby forming a composite material suspension, wherein the composite comprises the microfibrillated or nanofibrillated cellulose and the calcium carbonate or the precursors thereof, and wherein said calcium carbonate is formed or precipitated onto fibers or fibrils of the microfibrillated or nanofibrillated cellulose;

(iii) increasing the solid contents of said composite material suspension, thereby forming a high solid contents composite material suspension; and (iv) drying said high solid contents composite material suspension, through a simultaneous heating and mixing operation, whereby the substantially dry composite material is formed, the substantially dry composite material having a solids content in a range of 75-90 wt %; and (v) forming the substantially dry composite material into a paper substrate sheet or pressing and forming the substantially dry composite material into a composite product.

8. The substantially dry composite material of claim 7, wherein the two or more additives in step (ii) are carbon dioxide and lime milk.

9. The substantially dry composite material of claim 7, wherein a drying additive is added in step (iv).

10. The substantially dry composite material of claim 7, wherein the two or more additives further comprise stabilizers, surfactants, coupling chemicals, optical brighteners, lubricants, primers, absorbents, dyes, charge controlling agents, fillers, synthetic polymers, or combinations thereof.

11. A substantially dry composite material mixed with plastic materials, said substantially dry composite material comprising a nanofibrillated polysaccharide and two or more additives, wherein the nanofibrillated polysaccharide is a microfibrillated cellulose and wherein the two or more additives are lime milk and carbon dioxide, wherein the additives are allowed to react with each other and forming a precipitated calcium carbonate on the nanofibrillated polysaccharide, thereby forming said substantially dry composite material comprising precipitated calcium carbonate and nanofibrillated polysaccharide.

12. The material of claim 11, wherein said substantially dry composite material has a solids content in a range of 75-90 wt %.

13. The material of claim 11, wherein the material is in sheet form.

14. The material of claim 11, wherein the material is pressed and formed into a composite product.

15. The material of claim 11, wherein the two or more additives further comprise stabilizers, surfactants, coupling chemicals, optical brighteners, lubricants, primers, absorbents, dyes, charge controlling agents, fillers, synthetic polymers, or combinations thereof.

16. The material of claim 11, wherein the two or more additives further comprise polyphosphate dispersants, polyacrylate dispersants, or polyarylic dispersants.

17. The material of claim 11, wherein the two or more additives further comprise SDS, SDBS, or CTAB.

18. The material of claim 11, wherein the two or more additives further comprise maleic anhydride functionized chemicals, acrylic co-polymers, or acrylic acids.

* * * * *